United States Patent [19]
Gilbert

[11] Patent Number: 5,797,189
[45] Date of Patent: Aug. 25, 1998

[54] TOOL FOR CUTTING RECTILINEAR OPENINGS FOR ELECTRICAL OUTLET BOXES IN SHEET MATERIAL

[75] Inventor: Dale A. Gilbert, Wallace, Id.

[73] Assignee: Carl L. Blalack, Id.

[21] Appl. No.: 826,104

[22] Filed: Mar. 24, 1997

[51] Int. Cl.⁶ .......................... B23D 15/08; B23D 15/12
[52] U.S. Cl. ........................ 30/500; 30/372; 30/503.5; 83/618; 83/745; 144/363
[58] Field of Search .......................... 30/500, 502, 503, 30/166.3, 369, 393, 503.5, 371, 372; 144/363; 83/745, 751, 618; 408/24–26

[56] References Cited

U.S. PATENT DOCUMENTS

| | | | |
|---|---|---|---|
| 3,016,932 | 1/1962 | Jacobson | 143/63 |
| 3,391,460 | 7/1968 | Moore | 30/358 |
| 3,503,294 | 3/1970 | Vinciguerra et al. | 83/618 |
| 4,087,913 | 5/1978 | Jackson | 30/360 |
| 4,730,395 | 3/1988 | Blessing, Sr. | 30/360 |
| 4,951,395 | 8/1990 | Lameiro | 30/360 |
| 4,969,269 | 11/1990 | Dominguez | 30/360 |

Primary Examiner—Douglas D. Watts
Attorney, Agent, or Firm—Keith S. Bergman

[57] ABSTRACT

A cutting tool and associated positioning templates locate and cut rectangular junction box holes in dry wall or similar sheet material forming structural surfaces. Templates defining a medial positioning slot and providing a spaced pair of positioning pins are carried by pre-established junction boxes and surface sheeting material is established thereover with the positioning pins projecting through the sheet material to indicate positioning slot location. The tool provides a body articulately carrying two perpendicular pairs of spaced parallel saw blades that are moved reciprocably by spring biased driving linkage to cut rectilinear holes in the sheet material over the junction boxes. The saw blades have arcuate edges defining cutting teeth of opposite pitch on each side of the arcuate edge of the tool to aid positional maintenance and prevent chatter during cutting. A positioning blade carried by the body and extending beyond the saw blades passes through sheet material between the positioning pins and into the positioning orifice of the positioning template for tool positioning. The tool is partially covered by a peripheral casement carried by the body and is powered by an independent powering source positionally maintained by the casement.

14 Claims, 5 Drawing Sheets

TOOL FOR CUTTING RECTILINEAR OPENINGS FOR ELECTRICAL OUTLET BOXES IN SHEET MATERIAL

BACKGROUND OF INVENTION

1. Related Applications

There are no applications related hereto heretofore filed in this or any foreign country.

2. Field of Invention

My invention relates to tools for locating and cutting rectilinear holes in sheet material for pre-established electrical junction boxes therebeneath.

BACKGROUND AND DESCRIPTION OF PRIOR ART

In modern construction practice commonly wall frames are established, electrical junction boxes installed therein and sheeting material such as traditional dry wall thereafter established on the wall frames to form structural surfaces. At some point in this construction process, orifices must be established in the sheeting material to allow access to the underlying electrical junction boxes for installation of electric fixtures therewith. In the early history concerning the use of larger panels of sheeting material for wall surfaces, junction box orifices were commonly created before installation of the sheeting material by measurement, plotting and subsequent orifice cutting with a hand tool such as a knife or a keyhole saw. This process was time consuming, required substantial expertise and often produced orifices with rough, irregular and ragged edges that were not within the limits of accuracy required by pre-manufactured covers, electrical fixtures and other ancillary structures associated with the junction box orifices.

These problems have been recognized and responsively various solutions have become known, both to locate the positions of orifices and to cut sheeting material to create the orifices. Most locating methods have provided some type of indexing pins that have been carried by a junction box to project therefrom and through sheeting material established thereover. Commonly some type of template has been provided for positional association with the outwardly projecting portions of the locating pins to determine the position and in some instances the configuration of a hole to be created.

Normally if saws that cut by reciprocating perpendicularly to a wall panel are used to create holes, the cutting must be accomplished before the wall panel is installed to allow operation of the saw. With the development of hand manipulated routing tools, this type of rotary cutting tool has become popular for cutting junction box holes and, with an appropriately sophisticated cutter, this cutting may be accomplished after a wall panel is installed over a junction box, but such cutting requires substantial skill and experience.

Various specialized tools have heretofore been created for creating junction box holes in sheeting panels especially such as dry wall. Most such tools have provided two cutting dies, one of which is associated with the junction box structure beneath a panel, and has some alignment means projecting through sheeting material thereover to position the second die on the outer side of the sheeting material so that after positioning the two dies may be moved toward each other to create an orifice by severing the sheeting material between their peripheral edges. Various mechanical means have been developed to move such dies toward each other with appropriate force to cause a cutting or severing action, but most commonly lever linkages or impact means have been used for the purpose. These cutters require substantial force for their operation and by reason of this they often are time consuming, difficult and tiring to operate. Commonly such tools provide knife-like serrated portions to aid their cutting action and this again increases the amount of force required for cutting and tends to cut an irregular and jagged edge, especially in material such as dry wall where the medial portion of the material is softer and not particularly cohesive, but the outer surfaces are tough and substantially more cohesive. Several such tools have become known both in the patent literature and in the marketplace, but none appear to have gained any particular acceptance in the construction industry or any economic viability in the marketplace.

The instant tool is distinguished from such prior cutters in that it cuts with reciprocating toothed saw blades that oscillate parallel to the plane of the sheet material being cut. The power required by the instant tool is substantially less than that required by punch and die type cutters and the orifice cut has smoother, more cleanly defined edges that are perpendicular to the plane of the material. Both the elongate arcuate configuration and cutting action of the blades distinguish the instant tool from single bladed saws of the saber or keyhole type that reciprocate in a plane perpendicular to that of the material being cut to create an essentially different cutting action The cutting of holes in dry wall panels by hand manipulated routers has not proven completely satisfactory. The router cutter in general has had some substantial diameter, considerably greater than the thickness of an ordinary saw blade, and it commonly operates at a relatively high rotary speed. By reason of this nature and operation, a router cuts a large volume of dry wall material at relatively high speeds to create a substantial volume of particulate material of a relatively fine nature that is an environmental hazard in the workplace and difficult to clean up. If cutting is accomplished with a wall panel in place, as is often done, it is difficult to configure a router blade so that it may be guided by the junction box structure and yet be maintained in a position where the cutting portion of the blade does not come into contact with the junction box, or wiring therein to cause damage to either the router blade or wiring. It also is difficult to positionally maintain a hand manipulated router, especially when inserting a cutter blade through a sheeting panel to create an initial hole, and often wild cuts are made that extend outside the area desired to be cut to disfigure and damage a wall panel.

The instant tool in distinguishment provides four rectangularly arrayed, relatively thin saw blades that cut by reciprocating action and remove a substantially smaller volume of material from cuts than is removed by router blades. The reciprocating action of the multiple saw blades is of a different cutting nature and the cutting action is at multiple spaced points to provide substantially more stability and controlability. The cutting action also is materially slower than that of a router blade to create larger particles of removed material that are not so environmentally undesirable as the smaller particles created by a rotary cutter.

The problem of chatter between a tool and sheet material being cut is also solved in the instant tool. Firstly, the alignment blade is positionally maintained by a template during the cutting process so that the tool may not move materially from its properly aligned position. Additionally, the cutting edges of the saw blades used in the instant tool are of an arcuate configuration so that the length of a saw blade that initially contacts a panel is relatively short and the teeth on the blade are angled in opposite directions on each side of its middle, so that a blade cuts on one side of the middle in only one direction of travel. The square array of four spaced, simultaneously cutting blades also aids positional stability of the tool. These features substantially do away with any chatter of the tool during its use and resolve positional maintenance problems to prevent accidental wild cuts.

My tool, in distinction from self-powered cutting tools such as the ordinary router, is releasably attachable to a separate source such as an ordinary motorized electric drill for powering thereby. The use of a separate, readily available tool to provide a powering source substantially reduces the costs and complexity of my tool, but yet the powering source it uses may be one commonly available in most construction settings.

My invention lies not in any one of these features individually, but rather in the synergistic combination of all of the structures of the tool and templates that combine to give rise to the functions necessarily flowing therefrom as specified and claimed.

SUMMARY OF INVENTION

A cutting tool with associated positioning templates is provided to locate and cut rectilinear holes for junction boxes in structural sheeting material thereover. The positioning templates define a medial orifice and provide pairs of spaced positioning pins that maintain the template on a junction box and project outwardly through the sheeting material thereover to indicate the template location. The cutting tool provides a body carrying a medial centering blade projecting therefrom, beyond saws carried by the body, for insertion through sheeting material over the junction box and entry into the alignment orifice of the associated template to position and aid positional maintenance of the cutting tool thereover.

The tool body carries cutting structure with two perpendicular sets of spaced parallel saw blades arrayed to define the periphery of a hole to be cut for the junction box. The cutting structure is mechanically linked by plate springs, cams and slots to a medial crank shaft journaled in the tool body that upon rotation causes oscillating linear motion of the saw blades parallel to their length and in a plane parallel to sheeting material to be cut. Each saw blade has an arcuate cutting edge with teeth of opposite pitch defined on opposite sides of its middle, so that each blade cuts in opposite directions on each side and cuts over only a portion of its length at any time. The tool body and associated structures are carried in a peripheral casement that is releasably attachable to a motorized hand drill for powered rotation of the crank shaft.

In providing such structures, it is:

A principal object to create a tool, powered by a releasably associated powering device, to cut rectilinear holes for electric junction boxes in sheeting material thereover by perpendicular pairs of spaced parallel saw blades that reciprocate parallel to the plane of the sheeting material.

A further object is to provide such a tool that has an elongate positioning blade for use with a positioning template that defines a medial positioning orifice and is maintained on a junction box by spaced indexing pins that project through sheeting material thereover to indicate template position so that the positioning blade may be inserted through the sheeting material and into the positioning orifice to position and positionally maintain the tool over a junction box for cutting a hole.

A further object is to provide such a tool that has relatively thin saw blades with arcuate cutting edges defining oppositely pitched teeth on each side of their middle, so that the blades cut in only one direction on each side and then over only a portion of the total blade length, to avoid tool chatter and aid stable positional maintenance of the tool during cutting.

A still further object is to provide such a tool wherein each pair of saw blades are spring mounted and concurrently driven in reciprocating perpendicular directions during each half rotation cycle of a driving crank to provide further positional stability and better cutting action by the tool.

A still further object is to provide such a tool that is of new and novel design, of rugged and durable nature, of simple and economic manufacture and is otherwise well adapted to the uses and purposes for which it is intended.

Other and further objects of my invention will appear from the following specification and accompanying drawings which form a part hereof. In carrying out the objects of my invention, however, it is to be understood that its accidental features are susceptible of change in design and structural arrangement, with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF PREFERRED EMBODIMENT

Figure 1:
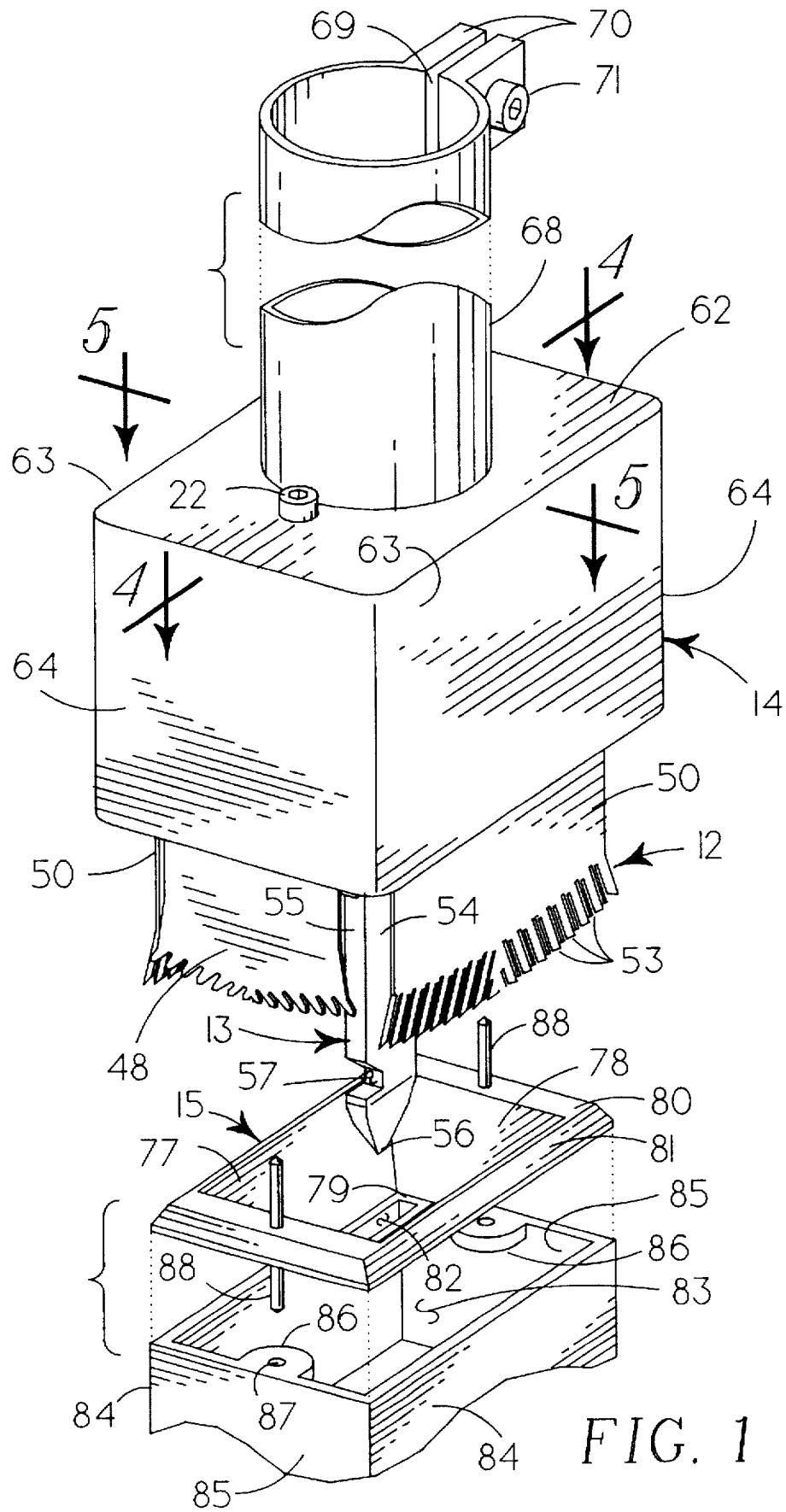
FIG. 1 is an isometric surface view of my tool and an associated positioning template, showing various of the tool parts, their configuration and relationship and the relationship of the tool to the positioning template.

My tool provides body 10 mounting driving linkage 11, cutting structure 12 and centering structure 13 that are partially covered by casement 14 which mounts external powering mechanism 16. Positioning template 15 is associated with the tool for positioning over a junction box.

Figure 3:
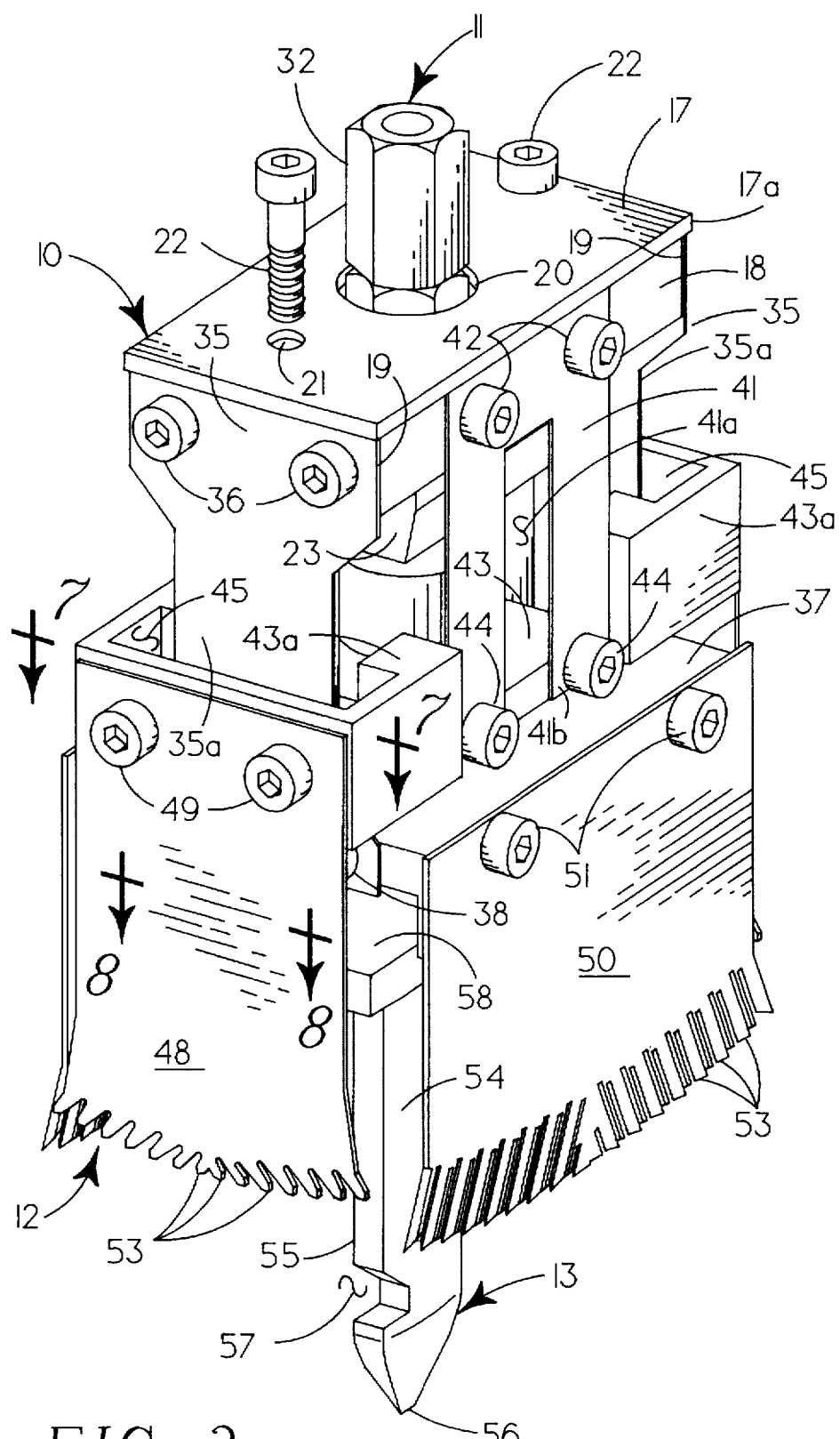
FIG. 3 is a somewhat enlarged isometric surface view of the body portion of my tool with the casement removed to show internal structure.

Referring to FIG. 3, it is seen that body 10 is a rectilinear structure formed with slightly peripherally larger top 17 interconnecting similar longer sides 18 and similar shorter ends 19 to define outwardly projecting top peripheral rim 17a. Top 17 defines medial drive shaft hole 20 and spacedly adjacent casement bolt holes 21 each threadedly carrying casement fastening bolts 22.

Figure 4:
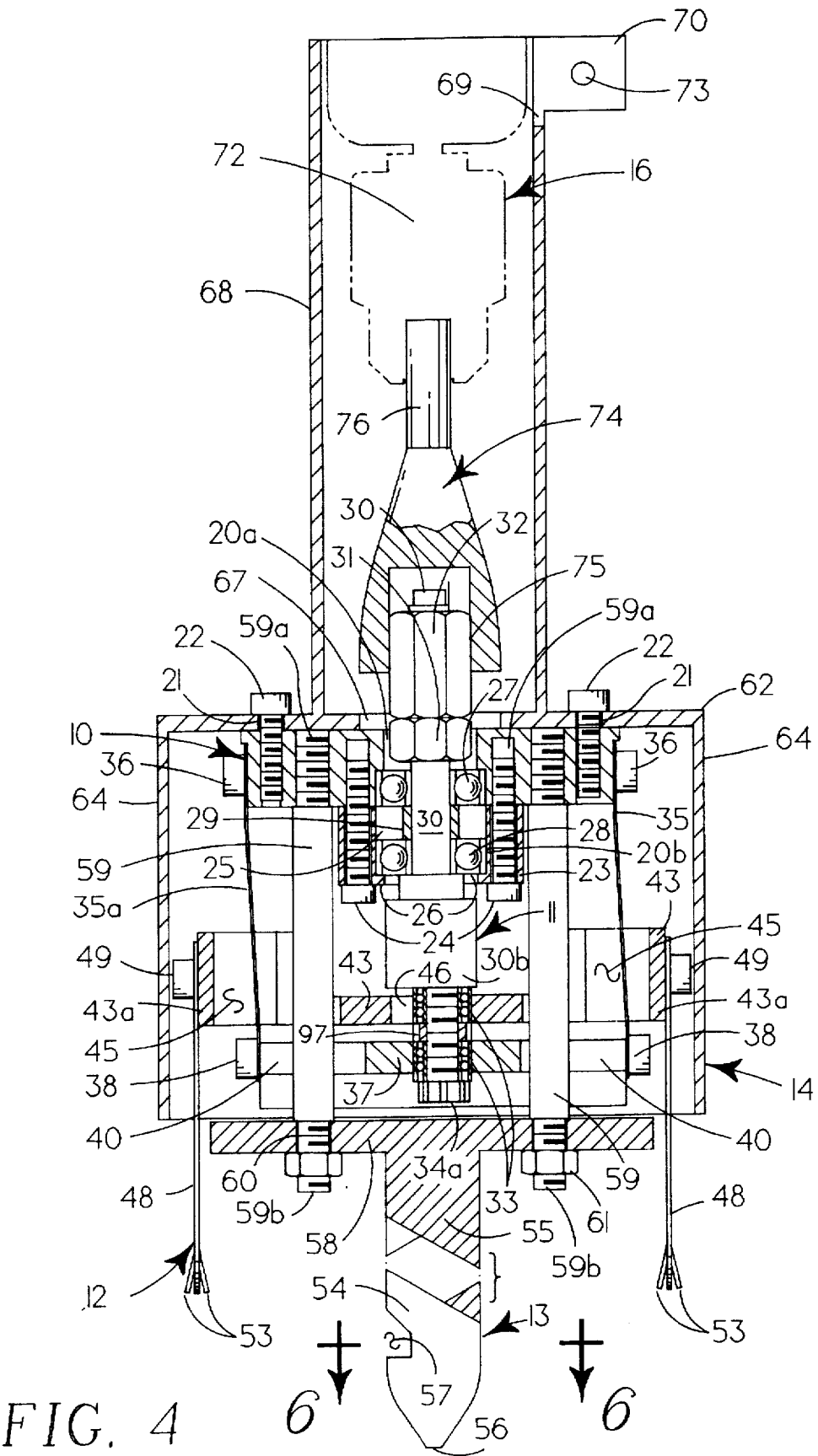
FIG. 4 is an elongate medial vertical cross-sectional view through the tool of FIG. 1, taken on the line 4—4 thereon in the direction indicated by the arrows.

The upper portion 20a of the drive shaft hole 20 is somewhat diametrically smaller than the lower portion 20b to accommodate the fastening of bearing structure for a drive shaft in the body. The bearing structure provides bearing housing 23 depending from the medial portion of tool body 10 and fastened thereto by bolts 24 extending therebetween as seen in FIG. 4. The bearing housing 23 defines medial channel 25 and inwardly extending lower rim 26 to maintain upper bearing 27 and lower bearing 28 in vertical relationship with collar 29 communicating between the two bearings 27, 28 to maintain spacing. The size of medial channel 25 is substantially the same as that of lower portion 20b of the drive shaft hole 20 so that the bearings 27, 28 are positionally maintained within the body 10 and bearing casement 23, as illustrated particularly in FIGS. 4 and 5.

Driving linkage 11 provides vertically oriented drive shaft 30 carried in its medial portion in bearings 27 and 28 to extend both spacedly above and below the body 10. The upper portion 30a of the drive shaft is threaded to carry inner locking nut 31 and outer driving nut 32 having a hexagonal, vertical surface extending above the upper portion of body 10 to allow irrotatable intercommunication with a powering mechanism 16. Lower portion 30b of the drive shaft is diametrically larger than the upper portion 30a to aid interconnection of eccentric driving shaft 34 depending therefrom. This eccentric driving shaft 34 is a bolt-like element having larger head 34a and threaded portion 34b extending into threaded engagement with portion 30b of the lower drive shaft. The body portion of the eccentric driving shaft carries bearings 33 maintained in spaced relationship by spacing collar 97 therebetween and positionally maintained between the eccentric driving shaft head 34a and enlarged portion 30b of the primary drive shaft.

As illustrated in FIGS. 3–4, paired side plate springs 35 both of similar configuration are fastenably carried by each shorter end 19 of body 10 to depend spacedly therebelow. Spaced bolts 36 extend through holes defined in the upper portion of the side plate springs 35 and into threaded engagement with the adjacent portion of body 10 to releasably interconnect the elements. The medial portion 35a of each side plate spring 35 normally has less width than the end portions to provide a thinner cross-sectional area of material to regulate the elasticity of the plate spring. The lower end portion of each side plate spring 35 interconnects rectilinear side saw blade plate 37 extending therebetween by spaced bolts 38 extending through holes defined in the side plate springs and into threaded engagement with the adjacent portions of the side saw blade plate 37.

Figure 8:
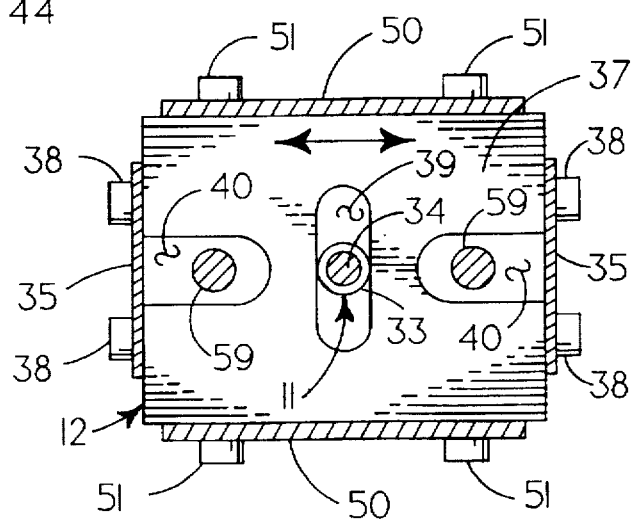
FIG. 8 is a horizontal cross-sectional view through the tool of FIG. 3, taken on line 8—8 thereon in the direction indicated by the arrows to show the side saw blade plate.

Side saw blade plate 37, as seen especially in FIG. 8, defines medial slot 39 to slidably receive a bearing 33 carried on eccentric drive shaft 34. This slot 39 has a width incrementally greater than the diameter of bearing 33 and a length sufficient to accommodate the lineal motion of the eccentric shaft 34 in an elongate direction between the side plate springs 35, so that as the eccentric shaft 34 rotates, the side saw blade plate 37 will be moved only forwardly and rearwardly in an elongate plane. The medially forward and rearward portions of the side saw blade plate 37 define fastening bolt channels 40 to allow the passage of fastening bolts communicating between the body and the centering structure without interference with the oscillatory motion of the side saw blade plate 37.

Similar opposed end plate springs 41 are fastenably carried by each of the longer sides 18 of body 10 by bolts 42 extending through holes defined in the upper portion of the springs 41 and into threaded engagement with the adjacent portion of the body 10. The end plate springs 41 define a medial channel 41a to lessen the overall effective cross-sectional area of the spring 41 to regulate elastic tension generated thereby when the spring is flexed perpendicularly to the plane of greatest area therethrough. The lower end portions of end plate springs 41b fastenably carry rectilinear end saw blade plate 43 therebetween by bolts 44 extending through holes defined in the lower portions of the side plate springs and into threaded engagement with the adjacent portions of the sides of the end saw blade plate. Similar forward and rearward end portions 43a of saw blade plate 43 extend vertically upwardly further than the medial portion 43b and define end plate spring slots 45 to allow the passage of the medial portions 35a of side plate springs 35 therebelow so that the side saw blade plate 37 may be carried spacedly below the end saw blade plate 43. The end portions 43a of the end saw blade plate are spaced sufficiently from each other to allow free rotation of enlarged lower medial portion 30b of drive shaft 30 therebetween.

Figure 7:
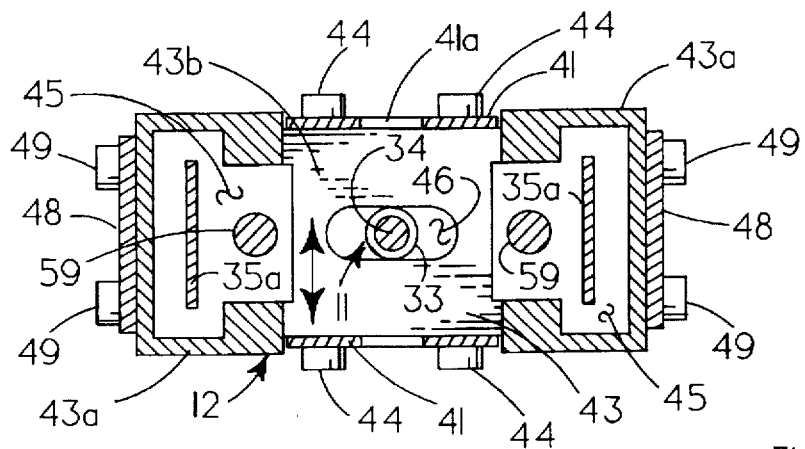
FIG. 7 is a horizontal cross-sectional view through the tool of FIG. 3, taken on the line 7—7 thereon in the direction indicated by the arrows to show the end saw blade plate.
Figure 6:
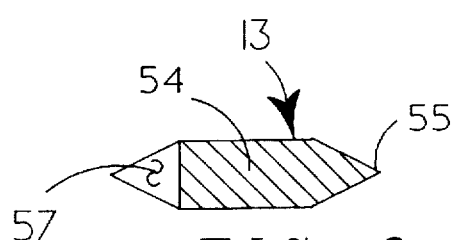
FIG. 6 is a horizontal cross-sectional view through the notch portion of the positioning blade of FIG. 4, taken on the line 6—6 thereon in the direction indicated by the arrows.

End saw blade plate 43 in its medial portion, as seen especially in FIG. 7, defines elongate drive shaft slot 46 extending with its longer dimension in a forward-rearward direction. This drive shaft slot 46 has a width incrementally greater than the diameter of bearing 33 to allow slidable motion of that shaft therein, and has a length in the lateral direction sufficient to allow motion of the eccentric shaft in this direction without restraint so that the end saw blade plate 43 will be moved in a laterally reciprocating motion as the eccentric shaft 34 carrying bearing 33 in that slot 46 is rotated. The end plate spring slots 45 are of sufficient size and so configured as to allow passage of fastening bolts interconnecting the body and centering structure and accommodate the reciprocating motion of the end saw blade plate 43 without interference from those fastening bolts.

As illustrated especially in FIG. 3, cutting structure 12 provides pairs of similar flat, planar end saw blades 48 and side saw blades 50. The end saw blades 48 are structurally fastened to the forward and rearward surfaces of the end saw blade plate 43 by spaced bolts 49 extending through holes in the upper portion of the end saw blades and into threaded engagement with the portion of the end saw blade plate 43 adjacent thereto. Paired spaced bolts 51 communicate through holes defined in the upper portion of side saw blades 50 to fasten these side saw blades to the side portions of side saw blade plate 37. The vertical extent of the end saw blades 48 and side saw blades 50 is such that the lowermost portions of all blades are substantially coplanar to allow simultaneous cutting action by portions of all blades.

Each saw blade 48, 50 has a lower symmetrically configured arcuate edge that defines a plurality of teeth 53 that are cut to pitch in opposite directions on opposite sides of the mid point of the arcuate lower edge of the blade, so that the teeth on one side of each saw blade cut in the opposite direction to the teeth on the other side of that blade. The saw teeth 53 are configured similarly to those of an ordinary carpenter's saw, with a reasonably fine pitch to make smoother cuts. The longer dimension of the saw blades must be such that neither set of end or side saw blades interferes with the other set during their reciprocating motions, though the blades at the extreme points of their motion path should extend substantially to the adjacent saw blade to properly cut a junction box orifice.

Figure 5:
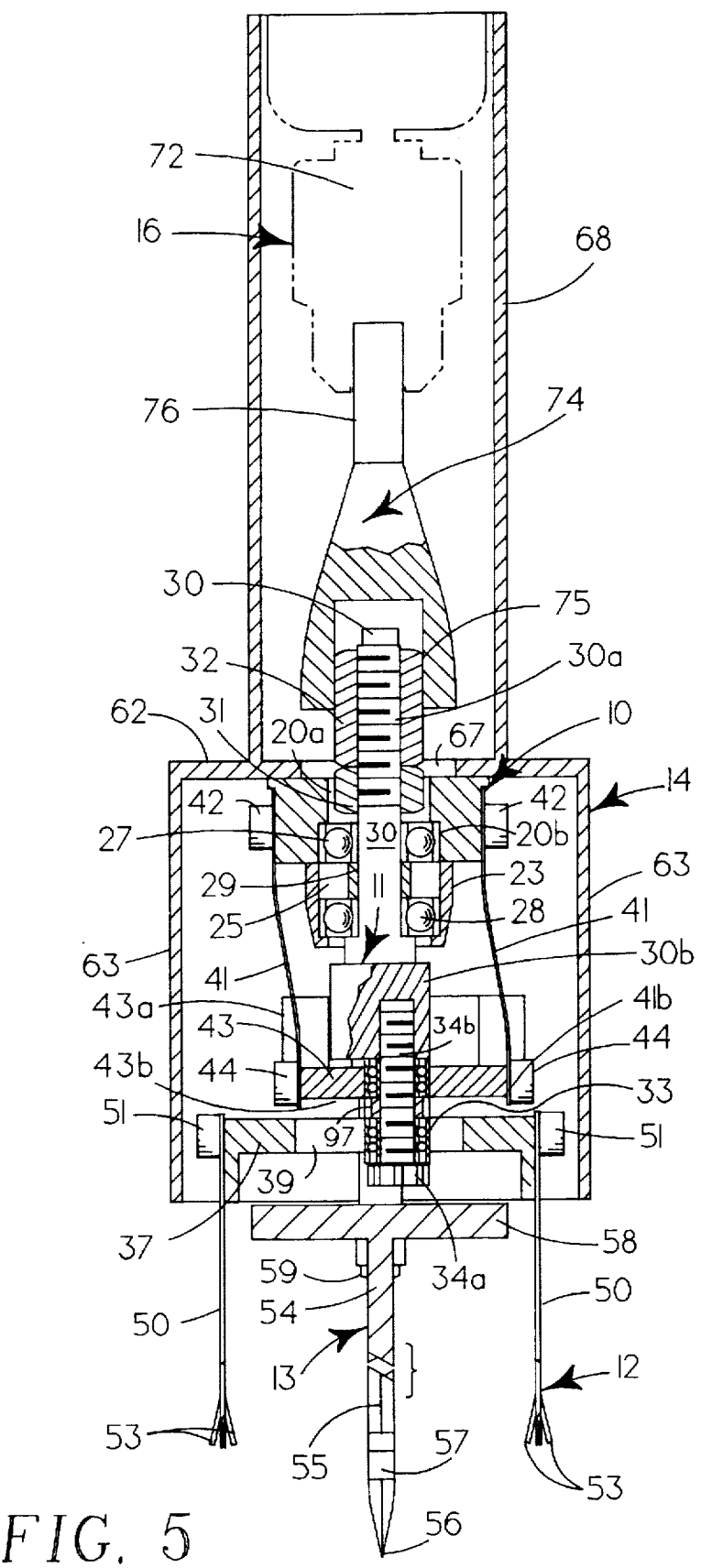
FIG. 5 is a traverse medial vertical cross-sectional view through the tool of FIG. 1, taken on the line 5—5 thereon in the direction indicated by the arrows.

Centering structure 13 as seen in FIGS. 4 and 5 provides saber-like positioning blade 54 having relatively acute, vertical side edges 55 and truncated pointed outer end 56.

The blade spacedly inwardly of its end 56 optionally may define notch 57 to aid in removing a positioning template over a junction box through an orifice after cutting. Such a notch 57 is not essential to my invention, however, and normally the tool functions well without the notch.

The blade 54 depends from structural interconnection with flat mounting plate 58. This mounting plate 58 has a generally rectilinear peripheral shape, with its edges of somewhat less dimension than the distance between the saw blades 48, 50 adjacent thereto to allow appropriate motion of those saw blades without interference from the mounting plate. The mounting plate 58 is supported spacedly outwardly of side saw blade plate 37 by plural bolts 59 depending from body 10. The bolts 59 have threaded inner end portions 59a fastenably engaged in holes defined in body 10 and threaded outer end portions 59b that pass through holes 60 defined in mounting plate 58 to carry nuts 61 on the outer surface of the fastening plate 58 for interconnection with the body.

Casement 14 provides a cover for operative mechanism of my tool and interconnects and positionally maintains the tool on a separate powering mechanism, in the case illustrated in FIG. 5 an ordinary electrically powered drill. As seen in FIG. 1, the casement 14 provides a rectilinear peripherally defined body formed by structurally joined top 62, similar sides 63 and similar ends 64, with the sides and ends depending to a position approximately coplanar with the top of blade mounting plate 58. Top 62 defines fastener holes 21 to accept headed fasteners 22 which pass therethrough and into fastenable engagement in threaded holes defined in the top and adjacent upper portion of body 10 to releasably fasten the casement on the tool body.

The medial portion of casement top 62 defines medial orifice 67 to allow passage of drive shaft 30 thereabove. Peripherally defined cylindrically tubular neck 68 extends from structural communication with top 62 spacedly upwardly to fastenably interconnect with the body portion of the powering tool inwardly of its chuck so as to positionally maintain my cutting tool on the powering tool, while yet not interfering with the rotation of the chuck of the powering tool, as illustrated particularly in FIGS. 4-5. The upper portion of this cylindrical neck 68 defines vertical slot 69, with similar spacedly opposed fastening ears 70 on both sides of the slot 69 to allow fastenable tightening of the upper portion of the neck 68 about a powering tool body by tightening bolt 71 extending through cooperating holes 73 defined in each ear 70.

As seen in FIG. 5, the interconnection between a drill chuck 72 and driving nut 32 carried by drive shaft 30 is accomplished by connecting structure 74 defining in its inner portion female hexagonal channel 75 to irrotatably carry driving nut 32 and cylindrical drive shaft 76 in its outer portion to communicate with an ordinary Jacobs type chuck 72 of a powering tool 16. This type of connecting structure may be convenient for use with my tool, but it is not necessary as if the neck 68 is shorter than illustrated, a powering tool may be connected directly with driving nut 32 for powering of the tool.

Positioning template 15 for a single junction box, as shown in FIG. 1, provides a concave medial truncated pyramidal portion formed by similar sides 77 interconnecting similar ends 78 and bottom 79. Flange 80 extends spacedly outwardly from the medial pyramidal portion to define chamfered peripheral edge 81. The flange 80 carries in the medial portion of each end at least one positioning pin 88 extending spacedly on both sides of the flange to communicate with fastener holes defined in junction boxes and extend visibly through sheeting material thereover. The medial portion of bottom 79 defines blade alignment slot 82, symmetrically between positioning pins 88, that is incrementally larger than the peripheral cross-sectional dimensions of positioning blade 54.

Junction boxes of the type commonly used in modern construction are substantially standardized in both dimension and configuration. Such a box for a single fixture, as partially seen in broken outline in FIG. 1, has an outwardly opening rectilinear orifice 83 defined by similar sides 84 and interconnecting ends 85 with fastening tabs 86 projecting inwardly from a medial portion of the upper edge of each end. Each fastening tab 86 defines medial fastener hole 87 to maintain electric fixtures (not shown) in or about such boxes. The positioning template 15 is so dimensioned and configured that the inwardly projecting portions of positioning pins 88, that are the depending portions in FIG. 2, extend into fastening holes 87 of the junction boxes and the inwardly extending medial truncated pyramidal portion fits within the orifice and chamber defined by a junction box with the peripheral flange 80 extending over the junction box orifice so that the template is positioned relative to the junction box with blade alignment slot 82 in a unique orientation. The positioning pins 88 in their outward extension are incrementally longer than the thickness of sheeting material thereover that is to be cut, so that when the sheeting material is placed over a junction box carrying a positioning template 15, the outward portions of the positioning pins 88 project discernably through the sheeting material to indicate the location of blade alignment slot 82 therebetween.

Figure 2:
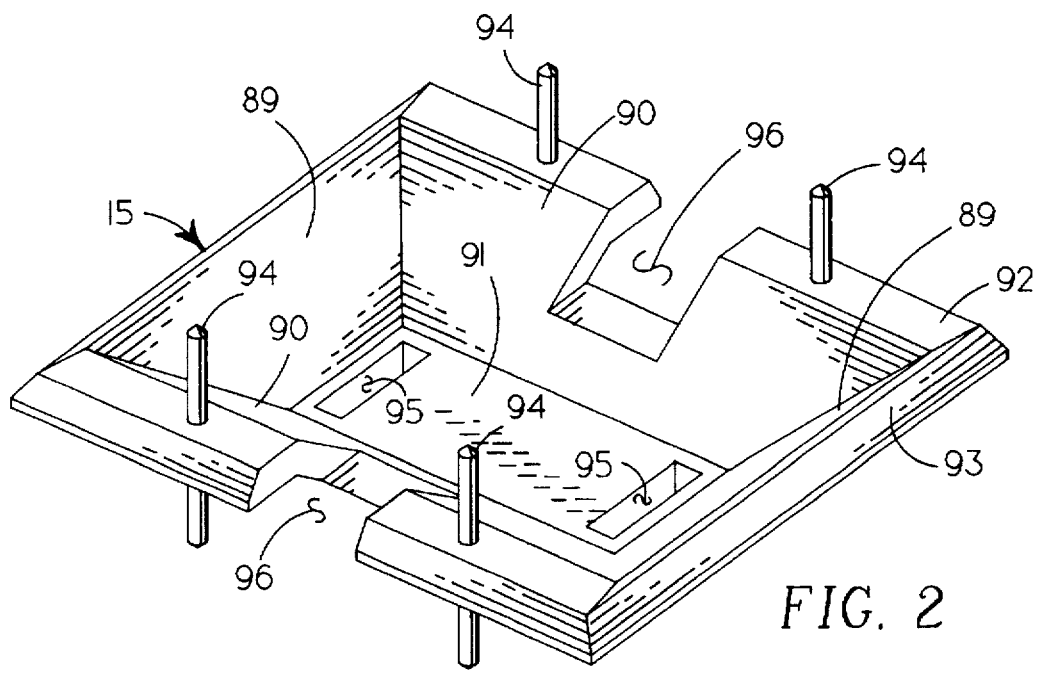
FIG. 2 is an isometric surface view of a positioning template for use with a multiple cavity junction box.

A template for a multiple element junction box is illustrated in FIG. 2. This template has the same essential structure as a single junction box template, with medial pyramidal portion formed by interconnected similar sides 89, similar ends 90, and bottom 91 with outer flange 92 having chamfered peripheral edge 93 extending about the orifice defined by the template. Each end portion of flange 92 carries two or more positioning pins 94 to fit in the fastening ears (not shown) provided for each individual electrical fixture to be included in the multiple box. The bottom 91 defines multiple elongate blade slots 95 to receive the blade of my tool to position it for cutting an orifice for each individual electrical fixture. The ends 90 and end portions of flange 92 cooperatively define saw slots 96 to allow passage of the saw blades of a tool that cuts the individual holes, and the blade slots 95 are so arrayed as to allow the tool to cut one individual slot portion of a hole for the multiple box when associated with a particular positioning blade slot. Templates may be formed in similar fashion for multiple junction boxes for more than two fixtures as illustrated by extending the principles used to form the two unit template, and those multiple junction box templates are within the ambit and scope of my invention.

Having thusly described the structure of my tool and associated template, their operation may be understood.

A tool is constructed according to the foregoing specification and positioning templates are formed in sufficient number and configuration to accommodate the various junction box orifices to be cut in a panel of sheeting material. An appropriately configured template is attached within the orifice of each junction box that is beneath the particular panel by establishing positioning pins 88 in fastening holes 87 of those boxes, with the outer portions of the positioning pins projecting outwardly from the templates. A sheet of wallboard or other sheeting material that is to be attached to a supporting wall frame is moved into position spacedly adjacent to the wall frame where it is to be attached and then moved into adjacency with the frame of the supporting wall frame by forcing the outwardly projecting portions of positioning pins 88 into and visibly through the sheeting material. The sheeting material then is structurally attached to the underlying supporting frame by known mechanical fasteners, adhesives or other fastening means so that it is fastened in final attached position on the wall frame, with positioning pins 88 projecting visibly therethrough to identify the location and orientation of each individual junction box therebeneath.

My cutting tool then is attached to a secondary powering tool 16, preferably an electrically powered drill as illustrated in FIGS. 4 and 5. Upper driving nut 32 is engaged directly in drill chuck 72 or as illustrated in connector 74, with the connector engaged in the powering tool chuck and the upper portion of casement 14 secured about the powering tool body inwardly of the chuck and its powering shaft to prevent my tool from rotating relative to the powering tool. The entire assemblage of cutting tool and powering tool then is manually positioned outwardly adjacent a junction box hole to be cut as determined by the visible positioning pins 88.

The positioning blade 54 is inserted by manual manipulation of the tool through the sheet material, with the blade's major cross-sectional dimension parallel to and at a point medially between the line joining the centers of the two positioning pins of the underlying template. The positioning blade 54 is moved inwardly toward the junction box until it contacts and passes into blade alignment slot 82 in the positioning template. The tool then will be positioned over the underlying junction box in a position to cut a hole for access to the junction box orifice.

The powering tool is then activated to operate my cutting tool by causing the four saw blades to move lineally in a limited oscillating fashion. With the tool thusly operating, it is manually moved inwardly toward the sheeting material so that the medial portions of the saw blades contact the surface of the sheeting material therebeneath and begin cutting that material. This inward motion of the tool is continued until a hole has been cut in the sheeting material at which point tool operation is discontinued. The hole that is cut is incrementally larger than the template therebeneath so that the template may be removed through the hole. If desired or necessary, the template removal may be aided by contacting the portion of the bottom about the periphery of blade alignment slot 82 with notch 57, if defined in the positioning blade 54, and removing the template with aid of the positioning blade.

This same procedure then is repeated for each junction box under the particular panel of sheeting material being installed so that all required junction box holes are created.

The detailed operation of the components of my tool may be understood with reference to FIGS. 7 and 8 where the end saw blade plate 43 and side saw blade plate 37 respectively are illustrated. Drive shaft slot 46 defined in end saw blade plate 43 extends in an elongate direction forwardly and rearwardly of the axis of drive shaft 30 so that as eccentric shaft 34 is rotated, it will move the end saw blade plate 43 in a cyclically reciprocating lateral motion against the bias of its supporting side plate springs 41. The end saw blade plate will have no motion in an elongate, forward or rearward direction since there is no driving force in this direction because of slot 46 and the plate springs 41 would prevent such motion in any event because of their inability to flex in this direction. Similarly side saw blade plate 37 defines drive shaft slot 39 extending in a lateral direction on both sides of the axis of drive shaft 30 so that as the drive shaft rotates, eccentric shaft 34 will cause this plate 37 to move in a cyclically reciprocating elongate motion against the bias of side plate springs 35. The side saw blade plate 37 will have no motion in a lateral direction by reason of the lack of any driving force in this direction because of slot 39 and the restraint of motion in this direction by blade springs 35. From this structure it is seen that the rotary motion of drive shaft 30, as transmitted to the saw blade plates 37 and 43 by the eccentric drive shaft 34 extending therebetween, will be translated into its two linear components to cause reciprocating lineal motion of the two sets of saw blades in a directions parallel to the blades to cause cutting action.

From the nature of the saw blades, it is to be noted that no more than one-half of any blade, and normally less, will cut during each half rotation of the drive shaft 30. It is also to be noted that when a cut is commenced with a particular blade, that blade will begin cutting only in its medial portion and not over its entire length by reason of its arcuately configured cutting edge. These features of my tool tend to relieve the so called "chatter" that gives rise to irregular and accidental motion of the a tool during its operation, as is common with other hand tools used to cut holes in sheet material.

It is further to be noted that though an electrically powered drill is specified as the preferred powering source, other powering tools and even electric motors that provide means for rotating drive shaft 30 are within the ambit and scope of my invention. The electrically powered drill is preferred because the speed of its rotation is well adapted to proper functioning of my tool, whereas if a router were used, its speed would be greater and my tool may not function as well, may not have as long a life and may produce more dust. Other common powering tools may require additional structures or modification of existing structures to interconnect with my tool and may be clumsy to manipulate and operate after interconnection.

The foregoing description of my invention is necessarily of a detailed nature so that a specific embodiment of it may be set forth as required, but it is to be understood that various modifications of detail, rearrangement and multiplication of parts might be resorted to without departing from its spirit, essence or scope. Having thusly described my invention, what I desire to protect by letters patent, and

What I claim is:

1. A tool for cutting rectangular holes in sheet material for access to the orifices of electrical junction boxes underlying the sheet material, comprising in combination:

a body rotatably carrying a drive shaft having first and second ends extending spacedly from the body, the first end of the drive shaft having means for interconnection with a powering source to provide rotary motion to the drive shaft;

first and second saw blade plates each articulatedly carried by the body in spaced overlying relationship about the second end portion of the drive shaft, each saw blade plate carrying a pair of similar parallel spaced saw blades extending away from the body, with the pair of saw blades carried by the first saw blade plate perpendicular to the pair of saw blades carried by the second saw blade plate and each pair of saw blades having a length less than the distance between the perpendicular pair of saw blades;

mechanical linkage communicating between the second end of the drive shaft and the first and second saw blade plates having means for translating rotary motion of the drive shaft into linear component motions to move each saw blade plate in lineally reciprocating motion parallel to the pair of saw blades carried thereby.

2. The tool of claim 1 having saw blades with cutting edges of convexly arcuate shape.

3. The tool of claim 2 wherein the convexly arcuate cutting edges have teeth pitched in opposite directions on opposed sides of the arcuate cutting edge to cut in opposite directions on each side of each blade.

4. The tool of claim 1 in which the mechanical linkage communicating between the second end of the drive shaft and the first and second saw blade plates comprises:

an eccentric shaft carried by the drive shaft to extend through slots defined in each saw blade plate, each of said slots having a width to allow sliding motion of the eccentric shaft therein, a length greater than the eccentricity of the eccentric shaft, extension perpendicular to the saw blades carried by the saw blade plate defining the slot and orientation symmetrical about the axis of the drive shaft.

5. The tool of claim 1 having at least one plate spring supporting each saw blade plate on the body to allow elastically resilient motion of each saw blade plate only in a plane parallel to the saw blades carried by that saw blade plate.

6. The tool of claim 1 having an elongate positioning blade carried by the body to extend outwardly of the saw blades and into an associated positioning template carried in a junction box beneath sheet material in which a hole is to be cut, said positioning template defining at least one medial positioning slot to receive the positioning blade to position the tool over the junction box to cut a hole in the sheet material, and having paired spaced positioning pins extending into sheet material thereover to indicate location of the positioning slot defined in the positioning template.

7. The tool of claim 1 with a peripherally defined casement carried by the body to partially cover the tool, said casement having:

an orifice for projection of the saw blades and and positioning blade therethrough, an upper orifice for projection of the first end of the drive shaft therethrough, and a neck about the upper orifice having means for releasably and irrotatably attaching a powering device thereto.

8. The tool of claim 7 having a powering device comprising an electric drill attached by the casement neck for positional maintenance to rotate the drive shaft.

9. A tool for cutting rectangular holes for electrical junction boxes in sheet material established thereover to provide access to orifices of the junction boxes, comprising in combination:

a rigid body;

cutting structure articulatingly carried by the body to extend therefrom including spaced, parallel, overlying saw blade plates, each said saw blade plate carrying a pair of similar spaced parallel saw blades extending spacedly away from the body with one pair of saw blades arrayed perpendicularly to the other pair of saw blades to cut the periphery of a rectangular hole;

driving linkage carried by the body including a drive shaft journaled in the body to extend spacedly adjacent the saw blade plates and mechanical means communicating between the drive shaft and the saw blade plates for moving each saw blade plate in limited reciprocal motion parallel to the saw blades carried thereby responsive to rotary motion of the drive shaft.

10. The tool of claim 9 having a peripherally defined casement, releasably carried by the body, with a medial portion extending away from the body distally from the saw blade plates to define a neck to irrotatably attach a powering tool to rotate the drive shaft.

11. The tool of claim 9 having positioning structure including an elongate positioning blade carried by the body to extend spacedly beyond the saw blades in a symmetrical position about the axis of the drive shaft.

12. The tool of claim 11 with the positioning blade carried in a positioning template carried by a junction box, said positioning template having a periphery similar to and incrementally smaller than an opening to be cut in sheet material for a junction box, a medial positioning slot to receive the positioning blade of the tool to position the tool to cut a hole about the periphery of the positioning template and two positioning pins extending through the positioning template to support it on an electrical junction box and project through sheet material established over the junction box to indicate position of the medial positioning slot.

13. The invention of claim 9 wherein each saw blade has a convexly arcuate cutting edge defining teeth that cut in opposite directions on opposite sides of the cutting edge.

14. The tool of claim 9 wherein the drive shaft carries an eccentric shaft that communicates through elongate slots defined in each saw blade plate symmetrically about the axis of the drive shaft and with their longer dimension perpendicular to the saw blades carried by the saw blade plates defining the slot and each saw blade plate is interconnected to the body by similar spaced plate springs having elastic resilience only in a plane parallel to the saw blades carried by the saw blade plate.

* * * * *